United States Patent [19]

Nakayama et al.

[11] Patent Number: 4,932,043
[45] Date of Patent: Jun. 5, 1990

[54] APPARATUS FOR CONTROLLING KEY TELEPHONE STATION SET IN KEY TELEPHONE SYSTEM

[75] Inventors: Yasunobu Nakayama; Yasuji Sato, both of Hachioji, Japan

[73] Assignee: Kabushiki Kaisha Toshiba, Kawasaki, Japan

[21] Appl. No.: 248,151

[22] Filed: Sep. 23, 1988

[30] Foreign Application Priority Data

Sep. 24, 1987 [JP] Japan ................................ 62-239585

[51] Int. Cl.$^5$ .......................... H04M 1/72; H04M 9/02
[52] U.S. Cl. ..................................... 379/157; 379/165; 379/173
[58] Field of Search ................ 379/159, 160, 165, 166, 379/172, 173, 157, 164, 183

[56] References Cited

U.S. PATENT DOCUMENTS

| | | | |
|---|---|---|---|
| 3,935,396 | 1/1976 | Barsellotti et al. | 379/165 |
| 4,520,235 | 5/1985 | Morikawa et al. | 379/165 |
| 4,536,615 | 8/1985 | Kimijima et al. | 379/159 |

*Primary Examiner*—Jin F. Ng
*Assistant Examiner*—Wing F. Chan
*Attorney, Agent, or Firm*—Foley & Lardner, Schwartz, Jeffery, Schwaab, Mack, Blumenthal & Evans

[57] ABSTRACT

A key telephone system including a key service unit, a plurality of key telephone station sets which are connected via speech lines for transmission of speech signals and via data lines for transmission of data, and a device provided at the key service unit for sending a predetermined discrimination signal to a selected key telephone station set via an associated speech line, whereby the key service unit sends key telephone station set information to the plurality of key telephone station set via the data lines, and each of the plurality of key telephone station sets derives its own key telephone station set information from the key telephone station set information sent via the data lines, on the basis of the discrimination signal sent via the speech line.

6 Claims, 3 Drawing Sheets

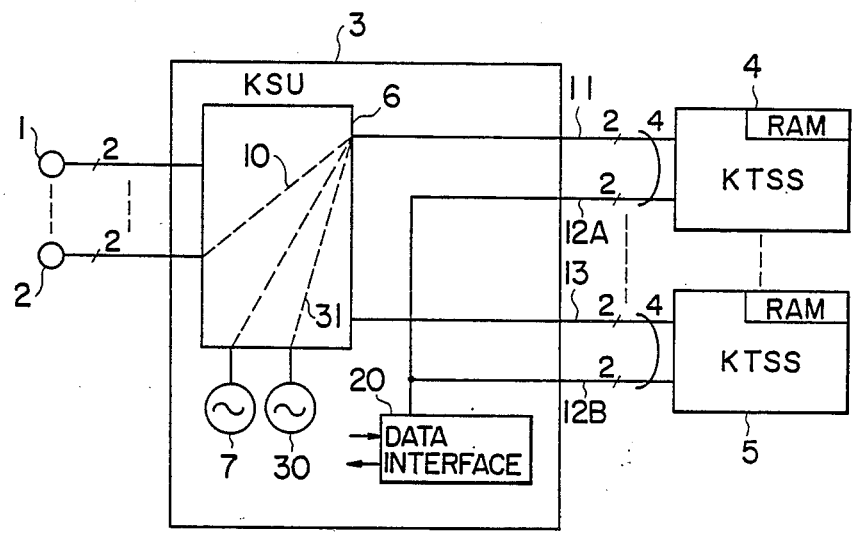
F I G. 1

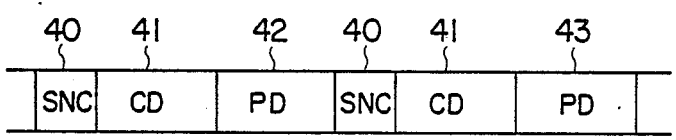
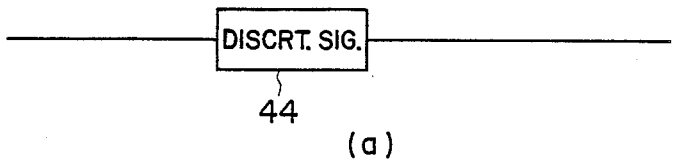
(a)
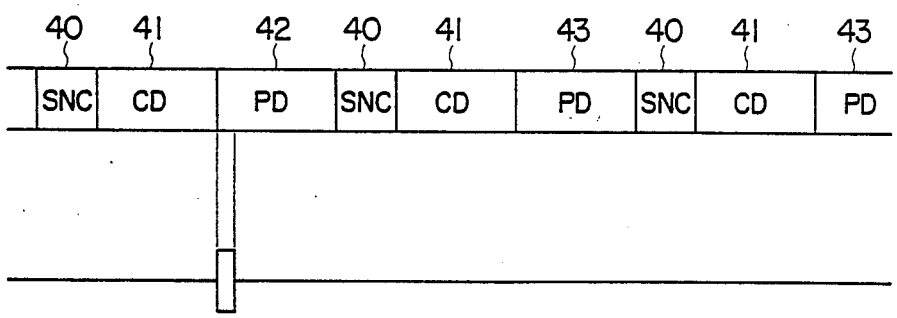
(b)
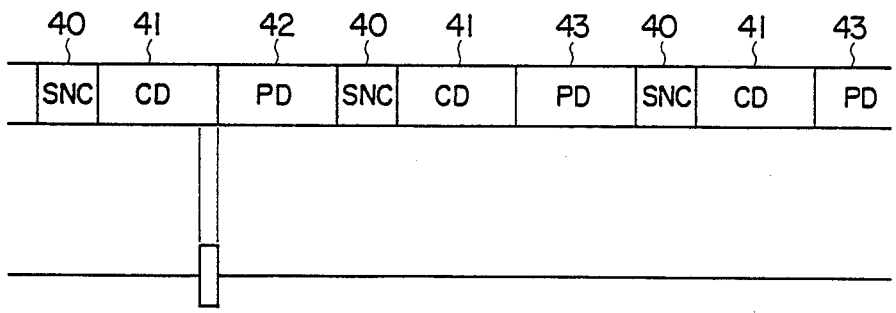
(c)
F I G. 2

APPARATUS FOR CONTROLLING KEY TELEPHONE STATION SET IN KEY TELEPHONE SYSTEM

BACKGROUND OF THE INVENTION

1. Field of the Invention

The present invention relates to a key telephone system, and more particularly to a key telephone system whereby data is controlled to be transmitted among the key service unit of the key telephone system (hereinafter called KSU) and key telephone station set thereof (hereinafter called KTSS).

2. Description of the Related Art

There are two methods of transmitting data among the KSU and a plurality of KTSS of a key telephone system.

According to one of the two methods, the KSU is provided with data interfaces to be used with respective KTSS, and the KSU and the key telephone station sets are connected via speech lines and data lines. According to the other method, the KSU is provided with a common data interface shared by plural KTSSs, and the KSU and the KTSS are connected via each speech line and common data lines.

The above conventional methods, however, have the following problems. Namely, the former method requires as many data interfaces as the number of KTSS, and the latter method is associated with some complexity in that it becomes necessary to give an identification number to each KTSS in order to have time-allocation use for the common data interface connected to the respective data lines.

SUMMARY OF THE INVENTION

The present invention has been made in consideration of the above circumstances, and it is an object of the present invention to provide a key telephone system having a KSU and KTSSs which are connected via speech lines and via data lines connected in common to data interfaces, wherein the apparatus requires a small number of data interfaces without necessitating the provision of identification number designation presetting switches to respective KTSS.

The above object is achieved by the present invention which provides a key telephone system comprising a KSU, a plurality of KTSSs which are connected via speech lines for transmission of speech signals and via data lines for transmission of data, and means provided at the KSU for sending a predetermined discrimination signal to a selected KTSS via an associated speech line, whereby the KSU sends KTSS information to the plurality of KTSS via the data lines, and each of the plurality of KTSS derives its own KTSS information from the KTSS information sent via the data lines, on the basis of the discrimination signal sent via the speech line.

With the key telephone system constructed as above, each KTSS derives its own KTSS information on the data line, on the basis of the discrimination signal received from the speech line.

BRIEF DESCRIPTION OF THE DRAWINGS

FIG. 1 is a block diagram showing an embodiment of the key telephone system according to the present invention;

FIGS. 2(a), 2(b) and 2(c) are timing charts illustrating the relation between data on data lines and a discrimination signal on a speech line;

DESCRIPTION OF THE PREFERRED EMBODIMENTS

The description is first directed to the related art, and then to the embodiments with reference to the accompanying drawings.

Figure 3:
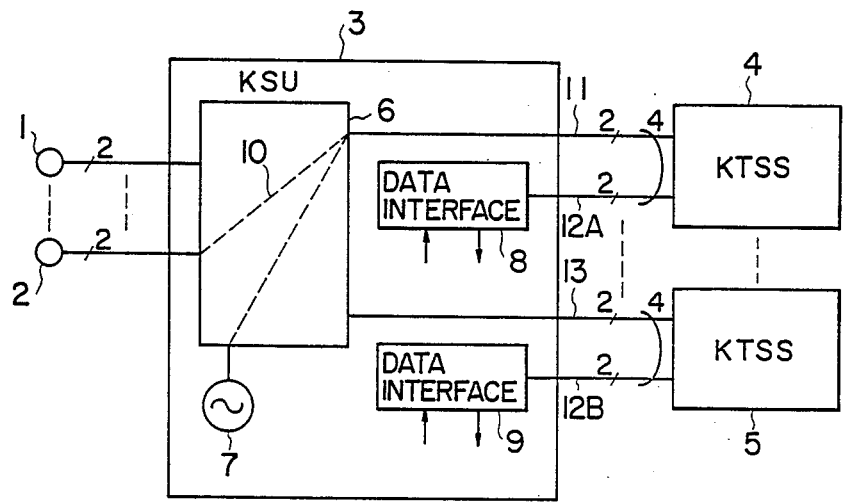
FIG. 3 is a block diagram showing a conventional key telephone system.
Figure 4:
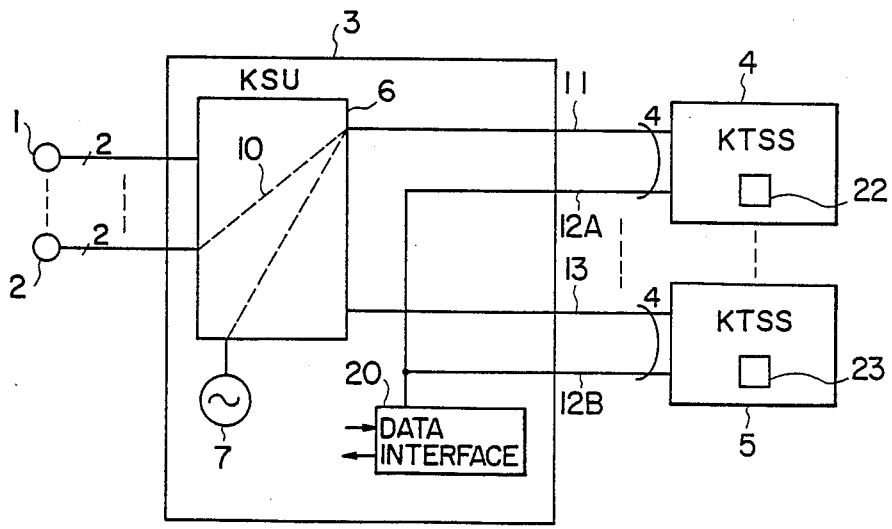
FIG. 4 is a block diagram showing another conventional key telephone system.

FIGS. 3 and 4 are block diagrams showing conventional key telephone system, wherein like elements are designated by using identical reference numerals. Each of the conventional key telephone systems shown in FIGS. 3 and 4 has a KSU 3 connected to a plurality of KTSSs 4 and 5. The KSU 3 has a speech exchange unit 6 to which a plurality of central office lines 1 and 2 to a key telephone station are connected. The KSU 3 and each of the KTSSs 4 and 5 are connected via speech lines 11, 13 and a pair of data lines 12A, 12B. Speech signals are transmitted via the speech line 11, 13 between the KSU 3 and each of the KTSS 4 and 5, whereas turn-on/off data of light emission diodes representative of line busy status or the like are transmitted via the data line 12A, 12B between both the KSU 3 and each of the KTSSs 4 and 5. The speech lines 11 to 13 from the KTSSs 4 and 5 are connected to the speech exchanger unit 6 within the KSU 3. A tone oscillator 7 for generating a dial tone of each KTSS is connected to the speech exchanger unit 6.

In the conventional apparatus shown in FIG. 3, the KSU 3 is provided with data interfaces 8 and 9 corresponding in number to that of the KTSS. Each of the KTSSs 4 and 5 is connected to the respective data interfaces 8 and 9 via associated pairs of data lines 12A, 12B, the data interface being in one-to-one correspondence with the KTSS. As seen from FIG. 3, as the speech line 11 of the KTSS 4 and the central office line 2 are connected at the speech exchanger unit 6 via a connection line 10 for speech communication of the KTSS 4 relative to the central office line 2, data are transferred via the data line 12A between the KTSS 4 and the data interface 8, and also data are transferred via the data line 12B between the data interface 9 and the KTSS 5, to thereby inform the KTSS 4 and 5 of the busy state of the central office line 2, display a dial number on the KTSS 4, etc. It becomes necessary for the conventional apparatus shown in FIG. 3 to prepare the data interfaces 8 and 9 dedicated to the respective KTSS 4 and 5 in order to supply data such as dial numbers specific to the respective KTSS.

In contrast with the apparatus shown in FIG. 3, the conventional apparatus shown in FIG. 4 has a smaller number of data interfaces, i.e., only a common data interface 20 to which KTSSs 4 and 5 are connected in common via data lines 12A to 12B. Each of the KTSSs 4 and 5 are independently controlled by time-allocated data send from data interface 20. It is therefore necessary for each of the KTSSs 4 and 5 to derive its own information from the time-allocated information transmitted to the KTSSs 4 and 5. To this end, each of the KTSSs 4 and 5 is provided with a number designation switch 22 and 23 by which a particular KTSS number is assigned to each KTSS 4 and 5. Thus, it is not necessary to use the same KTSS numbers when key telephone equipment is newly installed.

As explained above, the conventional key telephone system shown in FIG. 3 poses a problem that a dedicated data interface is required for each KTSS. Also, the conventional key telephone system shown in FIG. 4 poses a problem that a number designation switch is required to be mounted on each KTSS and presetting to identify it, although only a common data interface is required for this system.

FIG. 1 is a block diagram showing an embodiment of the key telephone system according to the present invention, and FIGS. 2(a), 2(b) and 2(c) are timing charts showing the relationship between data and discrimination signals. The key telephone system is constructed of a KSU 3 and a plurality of KTSSs 4 and 5. The KSU includes a speech exchanger unit 6 to which a plurality of central office lines 1 and 2 to a telephone station are connected, a tone oscillator 7 used for generating a dial tone of speech lines, and a data interface 20. The speech exchanger unit 6 is connected to the plurality of KTSSs 4 and 5 via speech lines 11 and 13. The KTSSs 4 and 5 are connected via data lines 12A and 12B to the data interface 20 which is provided only one, to thus effect data transmission among the KTSSs 4 and 5 and the data interface 20. An oscillator 30 connected to the speech exchanger unit 6 generates a discrimination signal. The oscillator 30 is also made connected to the KTSSs 4 and 5 via the speech exchanger unit 6 and the speech lines 11 and 13. The discrimination signal from the oscillator 30 is adapted to be independently supplied to each of the KTSSs 4 and 5 via the speech lines 11 and 13. Since the discrimination signal is supplied to each KTSS 4 and 5 via the speech lines 11 and 13, interference of the discrimination signal to the speech should be avoided, if necessary, e.g., during wait time. To this end, it is preferable to use an oscillator generating a signal at a non-audible frequency, such as a high frequency in the order of 50 KHz.

In the present embodiment, data to be transferred to the KTSSs 4 and 5 via the data lines 12A and 12B from the data interface 20 have the structure as shown in the time chart of FIGS. 2(a), 2(b), and 2(c). In particular, the data are constructed of the repetition of the combined structure of synchronous data (SNC) 40, common data (CD) 41 and KTSS information (PD) 42 specific to respective KTSSs, in this order. The common data 41 is a central office line status information common to all KTSSs, such as busy state, reception holding state and the like. The KTSS information 42 and 43 is information regarding each KTSS, such as central office line busy time, calling signal and the like. Assuming that the KTSS information 42 is for the KTSS 4 and that the KTSS information 43 is for the KTSS 5 other than the KTSS 4, the KTSS 4 requires information 42 and information 43, and the KTSS 5 requires information 43 and not information 42.

A discrimination signal, which is used for deriving a KTSS information of a particular KTSS from the above-described data, is shown in FIG. 2(a). The discrimination signal is supplied to the KTSS 4, 5 from the oscillator 30 via the speech line 11, 13.

In operation, if the KTSS 4 intends to use the central office line 2, the speech exchanger unit 6 causes the speech line 11 of the KTSS 4 to connect to the central office line 2 via a connection line 10, and causes the speech line 11 to connect to the oscillator 30 via a connection line 31. In the case where a means for reducing a leakage of an oscillation signal of the oscillator 30 to the central office line is insufficient in its performance, it is preferable not to carry out the interconnection between the line 31 and the oscillator 30 at the same time as that between the central office line 2 and the KTSS 4.

Thereafter, data from the data interface 20 as shown in FIG. 2(a) are sent to all the KTSSs 4 to 5 via the data lines 12A to 12B. On the other hand, the discrimination signal 44 from the oscillator 30 as shown in FIG. 2(a) is sent to the selected KTSS 4 via the speech line 11. The discrimination signal 44 is active only during the period while the KTSS information 42 required by the equipment 4 is present, as shown in FIG. 2(a). Therefore, the KTSS 4 can derive the KTSS information 42 on the data lines 12A to 12B as its own data, on the basis of the discrimination signal on the speech line 11. In this instance, a discrimination signal is not supplied to the speech line 13 of the KTSS 5 and so the KTSS 5 can judge that the KTSS information 42 is unnecessary information. In this manner, each KTSS 4 and 5 can derive only the necessary information from the data sent by the data interface 20, based on the discrimination signal supplied from the speech line 11 and 13. It is not necessary to prepare the same number of data interfaces as that of the KTSSs 4 and 5, and to provide the number designation switches for the KTSSs 4 and 5. The system can thus be simplified.

The present invention is not intended to be limited to the above embodiment only, but various modifications are possible. For example, when after installation of the system the discrimination signal is first sent to a KTSS via the speech line, an address of the KTSS (key telephone station set information) is sent on the data line to store the address of the KTSS in a RAM provided in the KTSS, to thereby automatically assign an address to the KTSS. Thus, all of the KTSSs are assigned their addresses respectively. Once an address is set at the KTSS, the KTSS information is added with the address at the top thereof. With such an arrangement, the discrimination signal is used only once at the time of setting the address, and thereafter it becomes possible to automatically derive the KTSS information required to a particular KTSS, on the basis of the address added to the KTSS information. In this case, there occurs no speech interference, particularly where a number of KTSS information are transmitted. Also, it is advantageous in that noises do not adversely affect the operation of the light emission diodes which indicate central office line busy status.

Further, in the above embodiment, the discrimination signal is being sent for the period while the KTSS information is transmitted. However, the discrimination signal may be sent only for the start period of the KTSS information as shown in FIG. 2(b), or only for the end period of the common data as shown in FIG. 2(c) to locate the following KTSS information.

As described so far, according to the present invention, a necessary KTSS information on the data line can be derived based on the discrimination signal on the speech line. Therefore, the key-button telephone system can reliably operate with a small number of data interfaces and without number designation switches on respective KTSS.

What is claimed is:
1. A key telephone system comprising:
   a plurality of key telephone station sets which perform an operation if a discrimination signal is re- ceived when key telephone station set information indicating said operation is received;

a plurality of speech lines connected, respectively, to said plurality of key telephone station sets;

a data line connected commonly to all of said key telephone station sets;

a key service unit having means for generating said discrimination signal and selectively applying said discrimination signal to said speech lines, and a data interface connected to said data line, said key service unit sending said discrimination signal from said discrimination signal generating means selectively along one of said speech lines to one of said plurality of key telephone station sets, and said data interface sending said key telephone station set information to said plurality of key telephone station sets along said data line so that only said selected one of said key telephone station sets receives both said discrimination signal and said key telephone station set information.

2. An apparatus as set forth in claim 1, wherein said discrimination signal is being sent for the period while said key telephone station set information is transmitted.

3. An apparatus as set forth in claim 1, wherein said discrimination signal is being sent only for the start period of said discrimination signal.

4. An apparatus as set forth in claim 1, wherein said discrimination signal is being sent at the end period of a common data preceding said key telephone station set information.

5. An apparatus as set forth in claim 1, wherein said discrimination signal has a frequency over the audible range.

6. An apparatus as set forth in claim 1, wherein said key telephone station set has a RAM in which said key telephone station set information is stored.

* * * * *